United States Patent [19]

Bedwell et al.

[11] 3,998,729

[45] Dec. 21, 1976

[54] ROCK SCREEN FOR SPREADER-LOADER

[76] Inventors: Thomas A. Bedwell; Bruce L. Call, both of Drawer G, Logan, Utah 84321

[22] Filed: May 2, 1975

[21] Appl. No.: 573,893

Related U.S. Application Data

[63] Continuation-in-part of Ser. No. 426,632, Dec. 12, 1973, Pat. No. 3,899,066.

[52] U.S. Cl. .............................. 209/240; 209/283; 171/63

[51] Int. Cl.² .......................................... B07B 1/06

[58] Field of Search .......... 209/240, 241, 283, 358, 209/359, 370, 247, 261, 262, 250; 171/63; 239/651; 19/205; 55/406

[56] References Cited

UNITED STATES PATENTS

| 239,536 | 3/1881 | Parker | 209/283 X |
|---|---|---|---|
| 1,044,796 | 11/1912 | Marquardt | 209/280 X |
| 1,250,590 | 12/1917 | Kardos | 209/283 X |
| 1,270,185 | 6/1918 | Matthes | 209/359 |
| 1,643,629 | 9/1927 | Pritchard | 209/358 |
| 1,899,803 | 9/1926 | Buker | 209/283 X |
| 2,968,400 | 1/1961 | Clute | 209/143 |

FOREIGN PATENTS OR APPLICATIONS

| 60,043 | 9/1938 | Denmark | 209/358 |
|---|---|---|---|
| 609,560 | 5/1926 | France | 209/247 |
| 756,823 | 4/1952 | Germany | 209/240 |

*Primary Examiner*—Robert Halper
*Attorney, Agent, or Firm*—Schmidt, Johnson, Hovey & Williams

[57] ABSTRACT

Liquid manure from an open pit is swept into the tubular housing of a loader by an impeller that rotates adjacent the housing inlet in close proxmity to one stretch of the housing wall that is in concentric relationship with the impeller. Stones larger than a predetermined size are screened from the manure by an arcuate grid that overlies the impeller in concentricity therewith. Thus, instead of ricocheting wildly within the housing following their separation from the manure, the stones are guided smoothly around the impeller and back out the inlet opening.

4 Claims, 8 Drawing Figures

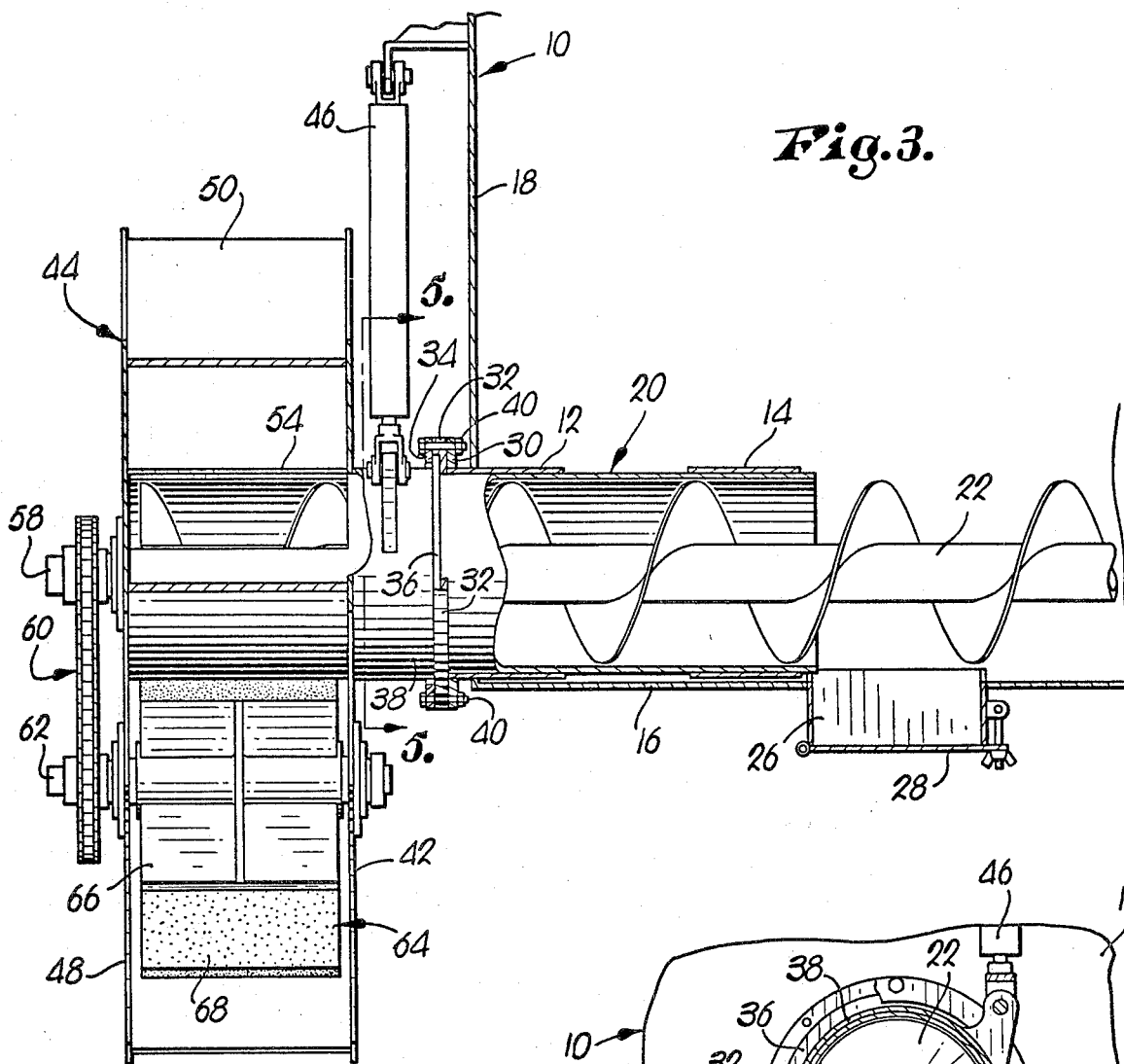
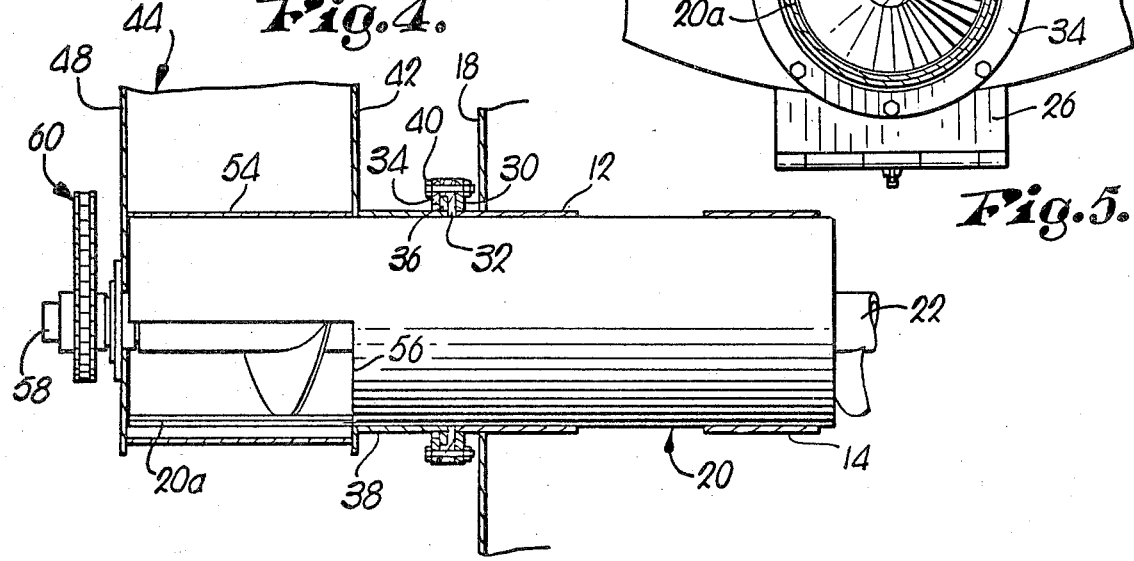

ROCK SCREEN FOR SPREADER-LOADER

CROSS REFERENCES

This is a continuation-in-part of our prior copending application titled "Liquid Manure Loading Apparatus," Ser. No. 426,632 now Pat. No. 3,899,066 filed Dec. 12, 1973.

This invention relates to systems for handling manure for use as a fertilizer and, more particularly, to the loading of liquid manure into the tank of a handling implement that has been backed into an open reservoir containing a pool of the manure.

The primary object of the present invention is to improve upon the teachings of our prior copending application titled "Liquid Manure Loading Apparatus" Ser. No. 426,632 filed Dec. 12, 1973.

More particularly, it is an important object of this invention to screen large stones from manure picked up by the loading impeller of our prior invention and to return such stones harmlessly past the spinning impeller to the pit. In the drawings:

FIG. 3 is a fragmentary, vertical cross-sectional view of the apparatus taken along irregular line 3—3 of FIG. 1;

FIG. 4 is a fragmentary, horizontal, cross-sectional view of the apparatus taken along line 4—4 of FIG. 1;

FIG. 5 is a fragmentary, vertical cross-sectional view through the loading auger of the apparatus taken along line 5—5 of FIG. 3;

DESCRIPTION OF FIGS. 1–5

Figure 1:
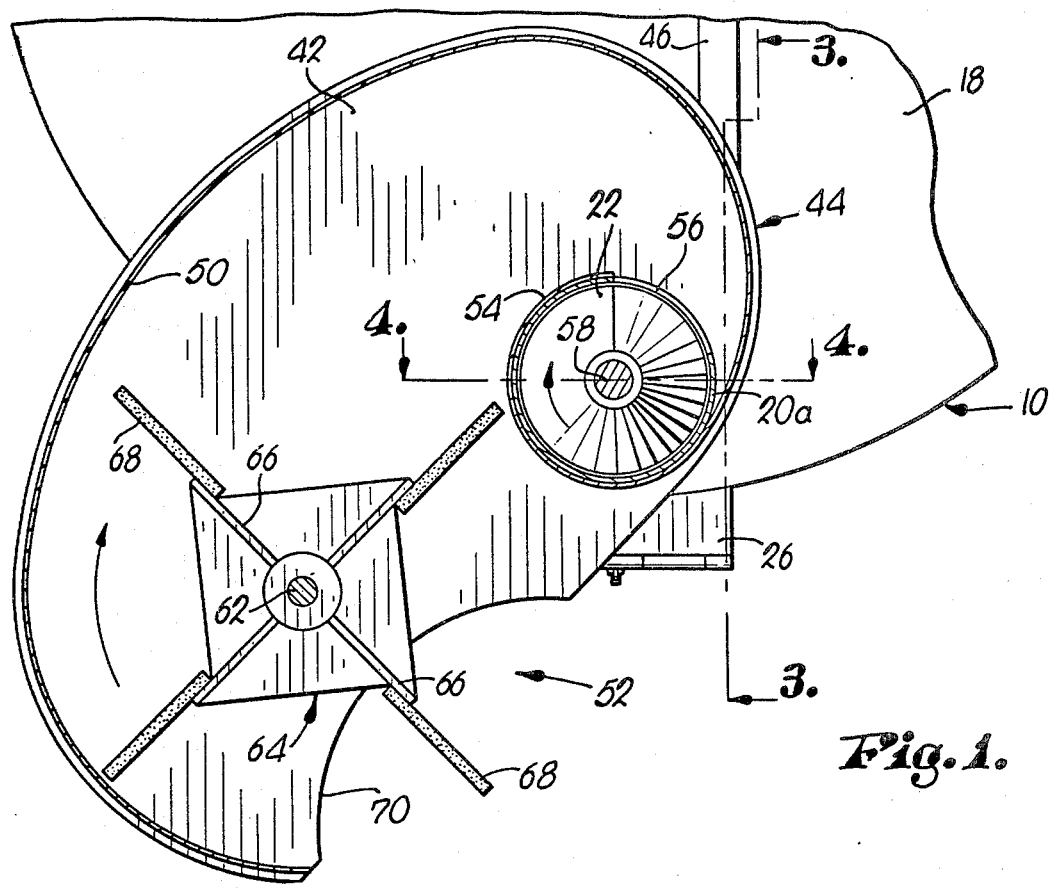
FIG. 1 is a fragmentary, end elevational view of the loading apparatus with the rear sidewall of the pickup housing removed and parts shown in cross-section for clarity, the housing being illustrated in its loading position.

The loading apparatus is adapted for use in connection with a tank 10 which is fragmentarily shown in the drawings, and it is to be understood that tank 10 is preferably rendered mobile through the use of suitable ground-engaging wheels (not shown). Further, it is to be understood that the tank 10 could, of course, form a part of a pull-type implement requiring the latter to be hitched to a suitable tractive vehicle, or it could form a part of a self-propelled implement. Preferably, the apparatus is mounted at the rear of tank 10 so as to allow the implement to be backed into the pool of liquid manure for loading purposes, although this too, is subject to variation and the principles of the present invention are not limited to such a rear-mounted arrangement.

The tank 10 has a pair of mounting collars 12 and 14 located adjacent and secured to the bottom 16 of tank 10, with the collar 12 projecting rearwardly through rear wall 18 of tank 10 and collar 14 spaced a distance inwardly from the latter. Tube structure 20, open at least at its inner end, is fixedly carried by collars 12 and 14 within tank 10 and projects outwardly beyond rear wall 18 for a substantial distance. A conveyor in the nature of a rotary auger 22 is coaxially disposed within tube 20 and terminates rearwardly at the same point as the latter, the forward end (not shown) of auger 22 being drivingly coupled with an appropriate drive source, such as the power takeoff of a tractor. The bottom 16 of tank 10 is provided with a stone sump 26 for collecting stones which may enter tank 10 through the loading apparatus, and sump 26 is provided with a hinged door 28 for periodically removing the collected stones.

The collar 12 has an exterior ring 30 welded thereto which abuts a similar ring 32 fixed to tube 20, the rings 30 and 32 cooperating with a third, independent clamping ring 34 to define a track for capturing a fourth ring 36 forming a part of a third collar 38 that is rotatably supported on tube 20. A series of circumferentially spaced bolts 40 releasably fasten the rings 30–36 together so that tube 20, collar 38 and auger 22 may be removed from tank 10 for shipping or maintenance purposes.

The third collar 38 is fixed at its outer end to one sidewall 42 of a generally elliptical housing 44 whereby to adapt housing 44 for swinging movement about tube 20 with rotatable collar 38. A fluid pressure piston and cylinder unit 46 operably interconnects rear wall 18 of tank 10 and collar 38 for swinging housing 44 between the lowered, loading position thereof illustrated in FIG. 1, and the raised, transport position thereof illustrated in FIG. 2.

The housing 44 has a second sidewall 48 spaced rearwardly from sidewall 42, and an arcuate, generally spiral guide wall 50 that extends transversely between sidewalls 42 and 48 along one stretch of the latter but is discontinuous along the opposite stretch thereof to define an intake area 52 for housing 44. As illustrated, the guide wall 50 leads away from intake 52 at one end of wall 50 and extends arcuately in an elongated convolution until approaching the tube 20 which it almost entirely envelopes in a tighter convolution having its center coincident with the axes of the tube 20, auger 22 and the axis of swinging movement of housing 44. The innermost terminal portion 54 of wall 50 is shiftable circumferentially about tube 20 to present a valve cover for an inlet 56 located within the first 80° of the wall 20a of tube 20. Thus, as illustrated, the inlet 56 is generally upwardly facing, is approached by guide wall 50 in spaced, spiral relationship from above the same, and is automatically closed and opened by terminal portion 54 during raising and lowering of housing 44 between the positions illustrated in FIGS. 1 and 2.

The auger 22 has an extended shank 58 that projects rearwardly beyond sidewall 48 and carries a chain and sprocket assembly 60 that is coupled with a shaft 62 extending through housing 44 in spaced, parallel relationship to auger 22. The shaft 62 is disposed adjacent intake 52 and carries a loader-agitator impeller 64 having a plurality of wide, radially extending paddles 66 provided with flat impact surfaces extending transversely between sidewalls 42 and 48. Preferably, each paddle 66 has a flexible, flat rubber tip 68 that defines such impact surface. A pair of segment shaped cutouts 70 are provided on the two opposed sidewalls 42 and 48 adjacent intake 52 in order to expose the tips 68 laterally during rotation of impeller 64. As illustrated, the tips 68 sweep along guide wall 50 in close proximity thereto during rotation of impeller 64 in the direction illustrated in FIG. 1 whereby to draw material into housing 44 in the manner hereinafter described.

OPERATION OF FIGS. 1–5

Figure 2:
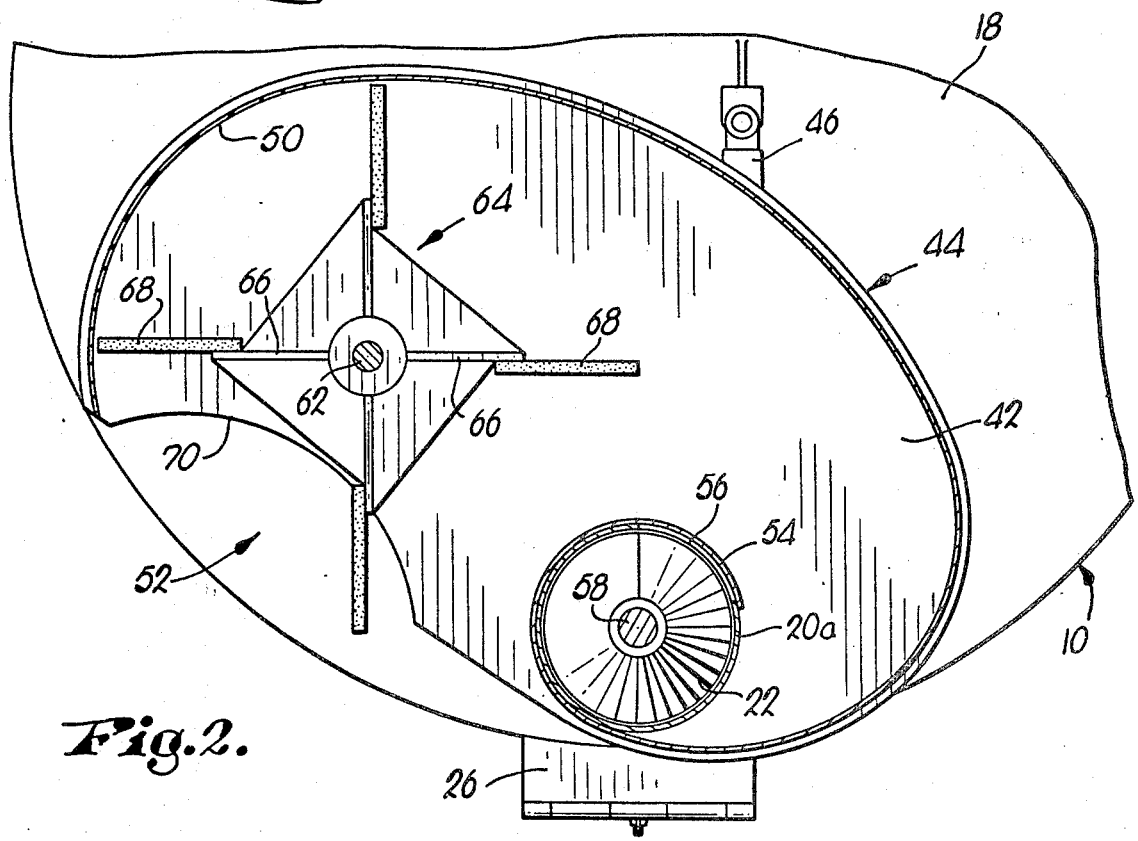
FIG. 2 is a view similar to FIG. 1 but with the pickup housing raised to its transport position.

In use, the empty implement is normally maintained with the housing 44 in its transport position as illustrated in FIG. 2 prior to arriving at the reservoir. With housing 44 so positioned the tank 10 is free of downwardly projecting obstructions which might drag on the ground when uneven terrain is encountered. Thus, in its transport position, the housing 44 is well protected against structures which might pass beneath the implement during advancement thereof and which might otherwise strike the housing 44 and seriously damage the loading apparatus.

Upon reaching the reservoir, the implement is moved down a ramp normally provided at such reservoirs until the level of the pool of manure approaches the bottom 16 of tank 10 at its intersection with rear wall 18. Thereupon, the fluid pressure to unit 46 may be released a sufficient extent to allow the housing 44 to swing downwardly in a counterclockwise direction as viewed in FIG. 2, until reaching its loading position as illustrated in FIG. 1 wherein the intake 52 is inserted into the pool of manure. Actuation of the power take-off of the vehicle or other drive means for the auger 22 in the proper direction, causes auger 22 to rotate clockwise, viewing FIG. 1, and such driving power is simultaneously transmitted to the impeller 64 through chain and sprocket assembly 60 to concurrently spin impeller 64 rapidly in a clockwise direction as illustrated in FIG. 1.

Rotation of the impeller 64 causes the paddles 66 to impinge upon the manure within the immediate vicinity of intake 52 and to draw the same into housing 44, not only from a direction to the right of intake 52 (viewing FIG. 1), generally perpendicular to the axis of rotation of impeller 64, but also in a lateral direction through the cutouts 70 in sidewalls 42 and 48. As the material is drawn into housing 44 between the impeller shaft 62 and guide wall 50, it is swept rearwardly and swirled upwardly along guide wall 50 in an elliptical path until reaching the top of housing 44 where it turns down into inlet 56. The auger 22 then carries the material from inlet 56 through tube 20 and into the interior of tank 10 to fill the same.

So long as both the impeller 64 and the auger 22 continue to rotate in the clockwise directions illustrated in FIG. 1, the manure flows into tank 10 without any retrograde escape from the latter back through the inlet 56 and intake 52. Thus, the filling efficiency of the loading apparatus is quite high and the loading process can be carried out in a remarkably short time.

Once the tank 10 has been filled, as evidenced by a suitable float device or the like (not shown) on the top of tank 10, the piston and cylinder unit 46 is actuated, while the auger 22 and impeller 64 continue to rotate, so as to swing the housing 44 into its transport position illustrated in FIG. 2. This causes the terminal portion 54 of guide wall 50 to shift circumferentially to the right from its position illustrated in FIG. 1, into covering relationship with the inlet 56 as illustrated in FIG. 2, thus effectively closing inlet 56 and preventing the escape of the manure from tank 10. The continued operation of auger 22 and impeller 64 during the raising of housing 44 assures that retrograde escape of the manure cannot occur during the interval that the terminal portion 54 is moving across inlet 56. Once the housing 44 is fully raised, the auger 22 and impeller 64 can be disengaged and the tank 10 will remain filled with manure without any escape thereof through the sealed inlet 56.

During the time that the manure is stored within the reservoir, it has a tendency to separate into several different levels which include a bottom level of heavier substances frequently containing a number of stones, an intermediate level of slurry, and a top level consisting of a crust which is formed from feed material contained in the manure. It is important that these various levels be thoroughly mixed together prior to or during removal thereof from the reservoir because each level has a definite value as fertilizer material, because without periodically disturbing the lowermost level the reservoir would tend to gradually reduce itself in size by a buildup of accumulated matter on the bottom thereof, and because the hard crust can create handling problems not only during loading, but also during spreading. In this respect, the loading apparatus of the present invention has proven to be highly desirable and successful because its impeller 64 so aggressively churns and agitates the manure during the loading process that no separate agitating step is required prior to actual loading of the implement as has heretofore been common practice. Not only does the impeller 64 thoroughly intermix the lowermost liquid levels of the pool, it also pulls the top crust of the pool toward the implement during loading and causes such crust to break apart and be thoroughly admixed with the liquid being drawn through intake 52. The result is a common slurry having crust particles of a size that can be easily handled by the apparatus. Substantial savings of valuable time and effort are obtained by the agitating ability of the present loading apparatus since it is only necessary for the operator to back the implement into the reservoir without prior agitation thereof and immediately begin to load the tank 10.

During the loading procedure the implement need not be backed into the reservoir to such deep extent as to jeopardize withdrawing the same from the reservoir when the level of the pool has reached a relatively low point. By virtue of the ability to place the intake 52 at a point substantially below the bottom 16 of tank 10 well into the pool of manure, the rear end of the tank 10 need not be inserted into the pool to the extent required with prior implements. Thus, not only is the loading procedure more safely carried out with the present invention, but the pool itself can be more fully drained than was heretofore possible.

It is also important to recognize that the automatic sealing or closing of the inlet 56 by the housing 44 when the latter is raised is a highly desirable feature of the present invention. Terminal portion 54 always closes inlet 56 when housing 44 is raised, and it maintains inlet 56 well sealed until housing 44 is purposely lowered. The automatic closing arrangement of the present invention assures that the loading operation can be carried out easily, rapidly, and without accidental spillage.

As earlier mentioned, it is not uncommon for the lower level of the manure pool to contain hard foreign objects such as stones. Because it is practically impossible to remove such stones from the pool prior to loading, the apparatus of the present invention has been designed to accept the stones during the loading process without jamming and without damage. In this respect, it is to be noted that the flexible tips 68 of the paddles 66, while being fully adequate to propel the manure and stones upwardly through the housing 44, are inherently capable of yielding when necessary to avoid lodging one or more stones between impeller 64 and guide wall 50. Moreover, the stones are well controlled during their travel through the apparatus, first being swirled upwardly along guide wall 50 and then entering inlet 56 from above the latter. The gravitational entry of the stones into inlet 56 has the beneficial effect of causing the stones to readily settle within tube 20 along the lower extent of the auger flighting, whereupon they can be easily pushed into tank 10 to drop into sump 26.

The subject matter of the present invention as hereinabove described is in no way related to the manner of unloading of the tank 10, and for that purpose, any suitable structure may be provided, including mechanism for spreading the manure onto the field as the vehicle is advanced, if so desired.

If necessary or desirable, the housing 44, pivot tube 20, and a part of auger 22 can be completely removed from tank 10. In this respect, loosening and removal of the bolts 40 allows the outer clamping ring 34 to be pulled away, hence permitting housing 44 with its collar 38 to be pulled off tube 20 when unit 46 is disconnected. Tube 20 itself thus becomes released, permitting its removal, and at least a rear section of auger 22, such a behind sump 26, can be subsequently withdrawn, provided any suitable connector (not shown) joining the front and rear sections of auger 22 above sump 26 has first been released. For this purpose, access can be had through sump 26.

DESCRIPTION AND OPERATION OF FIGS. 6–8

Figure 6:
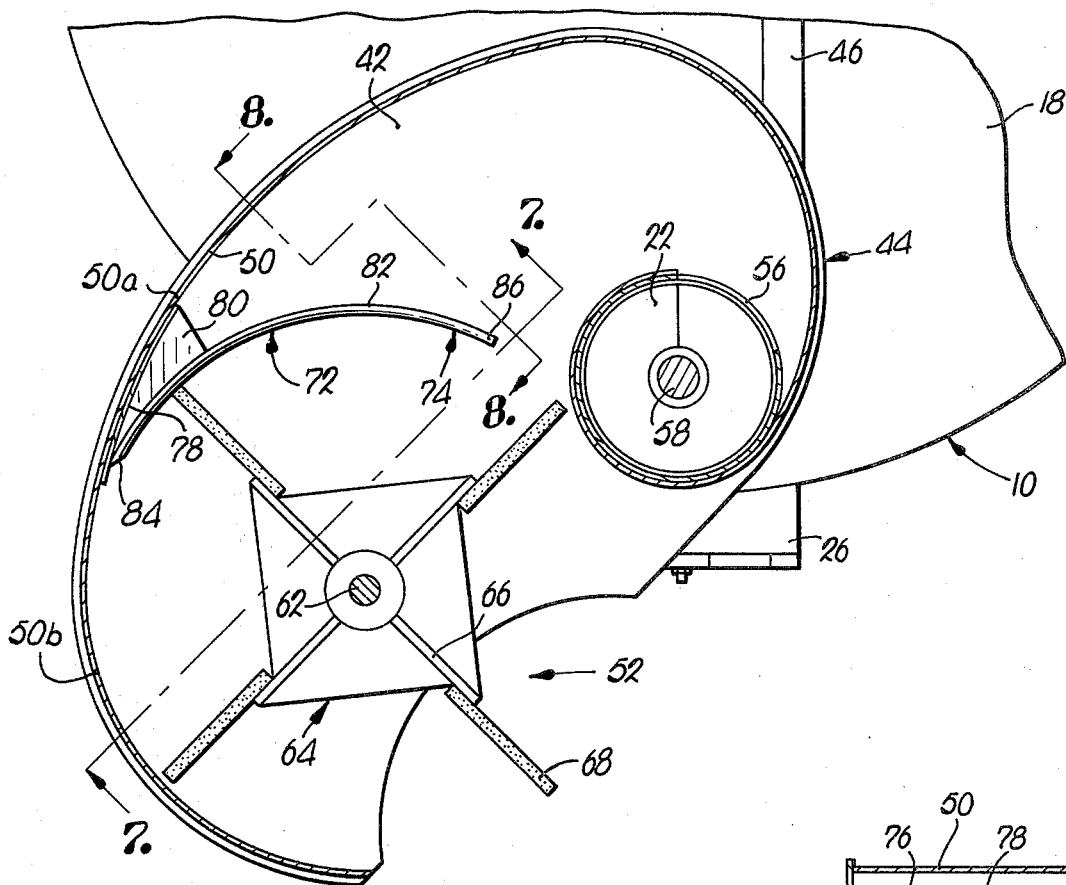
FIG. 6 is a fragmentary view of the apparatus similar to FIG. 1 and showing the addition of a rock screen in accordance with the principles of the present invention.
Figure 8:
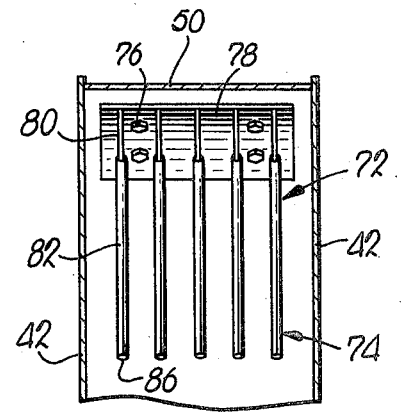
FIG. 8 is a fragmentary cross-sectional view of the apparatus taken along line 8—8 of FIG. 7.
Figure 7:
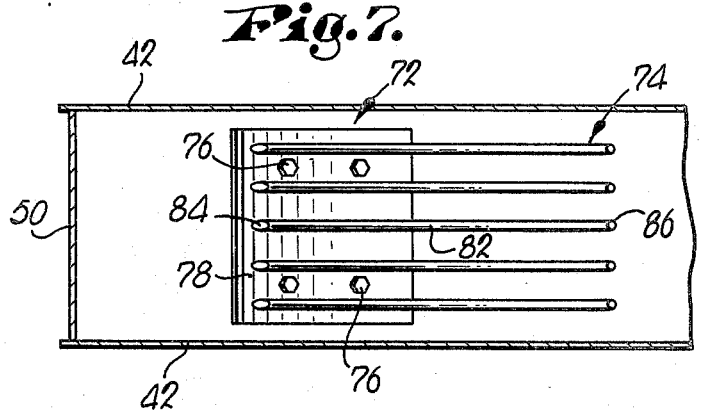
FIG. 7 is a fragmentary cross-sectional view of the apparatus taken along line 7—7 of FIG. 6.

It has been found that in many instances it is desirable to prevent stones from entering the auger 22 at all because of their tendency to bind between the auger 22 and tube 20, severely bending and twisting the veins of auger 22. In those situations, the rock screen 72 may be mounted inside housing 44 in the manner illustrated in FIGS. 6–8 in order to cause the immediate and harmless return of stones that have been picked up by the spinning impeller 64.

The rock screen 72 comprises a perforated member in the nature of a grid 74, that is affixed to flatter stretch 50a of guide wall 50 by fasteners 76 extending through a mounting plate 78. A number of gussets 80 extend inwardly edgewise from plate 78 and carry a series of laterally spaced apart arcuate rods 82. Rods 82 are equally spaced across the housing 44 between sidewalls 42 thereof and merge at their innermost ends 84 with the wall 50 at the intersection of stretch 50a and lower stretch 50b that is substantially concentric with the impeller 64. The opposite ends 86 of rods 82 are free so that rods 82 are carried in a cantilever manner by the gussets 80.

It is important to note that the arcuate screen 72, being substantially concentric with impeller 64, is effectively an extension of the concentric stretch 50b of wall 50, both stretch 50b and screen 72 being disposed in close proximity to the impeller tips 68 so that the latter sweep closely therealong during rotation. Accordingly, as manure and stones are drawn into the inlet opening 52 by the spinning impeller 64 and are fed along the wall 50 toward the discharge opening of housing 44 defined by inlet 56 to tank 10, stones which are larger in diameter than the spacing between rods 82 are screened from the manure while smaller stones and the manure itself continue along wall 50 to be delivered into tank 10. The large stones, as they are swept along wall stretch 50b are gradually lifted away from flat stretch 50a by the rods 82 and are progressively diverted further and further away from wall 50 as the free rods ends 86 are approached. By the time the stones reach ends 86, their paths of travel have been completely reversed so that they then have no choice but to be flung back out through the inlet opening 52. Note that the stones being separated are under complete control during their brief travel around the impeller 64 and are not allowed to ricochet wildly around within the housing 44 to damage impeller 64. From the moment they are swept into inlet opening 52, the stones are confined between opposed paddles 66 on the one hand and the arcuate wall stretch 50b or arcuate rods 82 on the other hand. The tendency, of course, is for the stones to be swept along stretch 50b and rods 82 in engagement with the same and with the paddle 66 pushing them in a virtually complete circle. Hence, the stones are handled with a high degree of control and are removed very early in the loading process so as to substantially eliminate any possibility of damage. Those small stones passing with the manure between rods 82 can simply settle out into the sump 26 from which they can be periodically removed.

Having thus described the invention, what is claimed as new and desired to be secured by Letters Patent is:

1. In a loader for liquid manure products:
   a housing having an intake opening, a discharge opening, and an arcuate flow passage for said products communicating said openings with one another for product flow through the housing along an arcuate path of travel;
   an arcuate perforated member across said intake opening and spaced inwardly from the latter within said passage,
   said discharge opening being spaced from said intake opening downstream from said member flow; and
   a rotary sucking impeller mounted within said space in substantially concentric relationship with the member for drawing products into the passage on one side of the impeller, screening foreign objects from the products along the member, and propelling such foreign objects back out the intake opening on the opposite side of the impeller,
   said housing having a passage-defining wall,
   said member merging with said wall on said one side of the impeller and terminating in a free end spaced from said wall on said opposite side of the impeller.

2. In a loader for liquid manure products as claimed in claim 1, wherein said member includes a grid having a series of laterally spaced apart rods disposed substantially concentrically with the impeller, each rod extending in the direction of impeller rotation.

3. In a loader for liquid manure products as claimed in claim 2, wherein said grid is closely spaced from the periphery of the impeller generally above the latter.

4. In a loader for liquid manure products as claimed in claim 1, wherein said passage extends in a generally converging spiral from said intake opening to said discharge opening, said member being disposed across the passage between and in spaced relationship to said openings at opposite ends of the spiral.

* * * * *